(12) United States Patent
Sauer et al.

(10) Patent No.: US 7,181,971 B1
(45) Date of Patent: Feb. 27, 2007

(54) AUTOMOTIVE RATTLE DETECTION SYSTEM

(75) Inventors: Steven J. Sauer, Lake Havasu City, AZ (US); Edward J. Sauer, Lake Havasu City, AZ (US)

(73) Assignee: AutoTech Innovations LLC, Reno, NV (US)

( * ) Notice: Subject to any disclaimer, the term of this patent is extended or adjusted under 35 U.S.C. 154(b) by 0 days.

(21) Appl. No.: 11/280,641

(22) Filed: Nov. 17, 2005

(51) Int. Cl.
  *G01M 7/00* (2006.01)
(52) U.S. Cl. ...................................................... 73/670
(58) Field of Classification Search ............... 73/11.04, 73/11.05, 11.07, 11.08, 11.09, 669, 670
  See application file for complete search history.

(56) References Cited

U.S. PATENT DOCUMENTS

| | | | | |
|---|---|---|---|---|
| 3,690,145 A | * | 9/1972 | Brisard | 73/11.08 |
| 3,902,258 A | * | 9/1975 | Ross | 434/375 |
| 3,914,990 A | * | 10/1975 | Borg | 73/670 |
| 4,658,656 A | * | 4/1987 | Haeg | 73/669 |
| 4,912,970 A | * | 4/1990 | Gicewicz | 73/146 |
| 4,986,119 A | * | 1/1991 | Gicewicz | 73/146 |
| 5,103,595 A | * | 4/1992 | Dale et al. | 451/5 |
| 5,435,185 A | | 7/1995 | Eagan | 73/587 |
| 5,551,298 A | | 9/1996 | Rayment | 73/669 |
| 5,574,226 A | | 11/1996 | Reuther et al. | 73/669 |
| 6,360,593 B1 | * | 3/2002 | Schoenfeld | 73/146 |

* cited by examiner

*Primary Examiner*—Eric S. McCall
(74) *Attorney, Agent, or Firm*—Bernard M. Weiss

(57) ABSTRACT

A rattle and noise detection system useful for a large variety of automotive vehicles is provided. The vehicles are examined in a stationary position with one of their tires having been driven onto said detection system. This tire rests against a roller assembly driven by an electromechanical drive train, electrically powered and remotely controlled. Each roller in the assembly can individually rotate around its center axis as the assembly itself rotates over a specific RPM range causing the longitudinal side of each roller to continuously strike the tires' treaded lower half at a predetermined position. This position is primarily a function of the tire size and the roller assembly's diameter and mounting position in the detection system. As the rollers continuously strike the tire, vibrations and shock waves are produced in the vehicle causing and maintaining the same annoying rattles, squeaks and noises noticeable during driving conditions. The detection system operator, who ideally is an automotive technician, is thereby empowered to efficiently locate, repair a problem, and immediately determine the repair's success. A tire positioning and holding system is also devised for operation on a surface that is not essentially level.

16 Claims, 7 Drawing Sheets

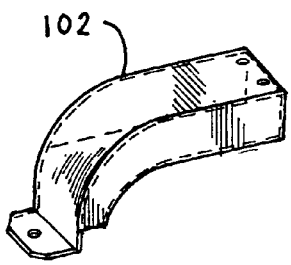
FIG. 2
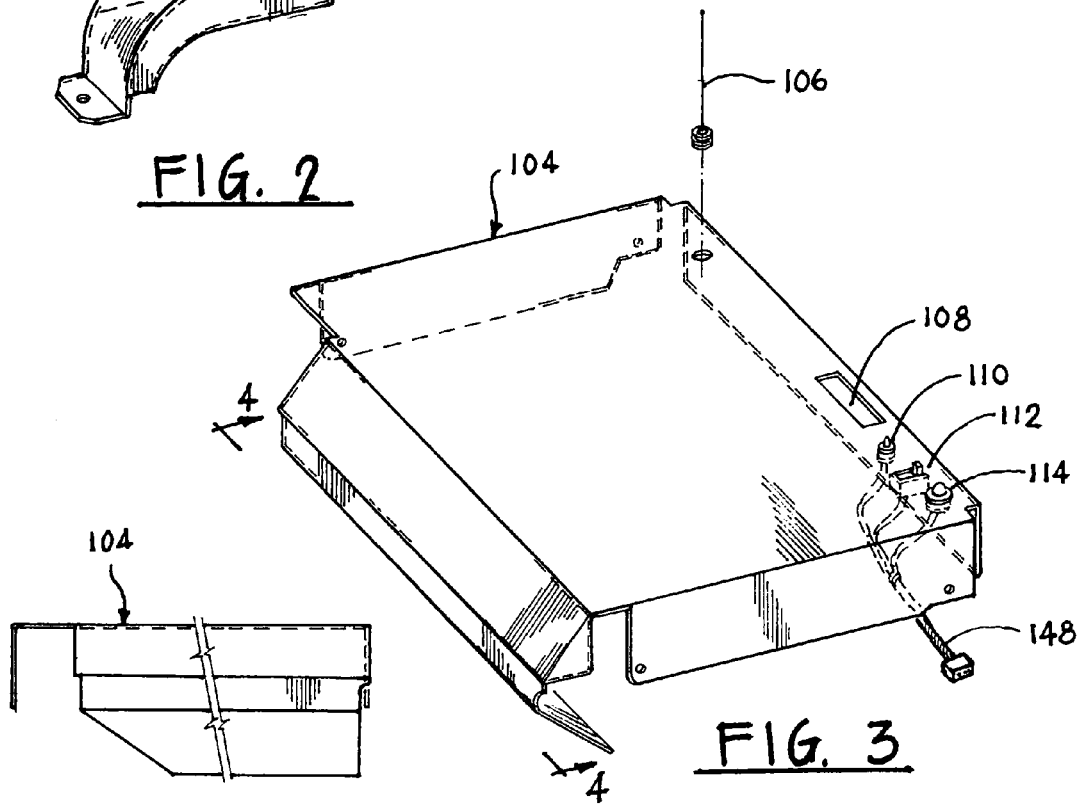
FIG. 3
FIG. 4
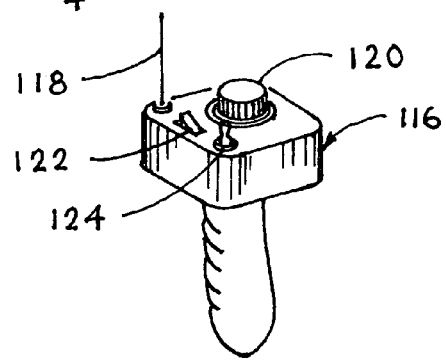
FIG. 5

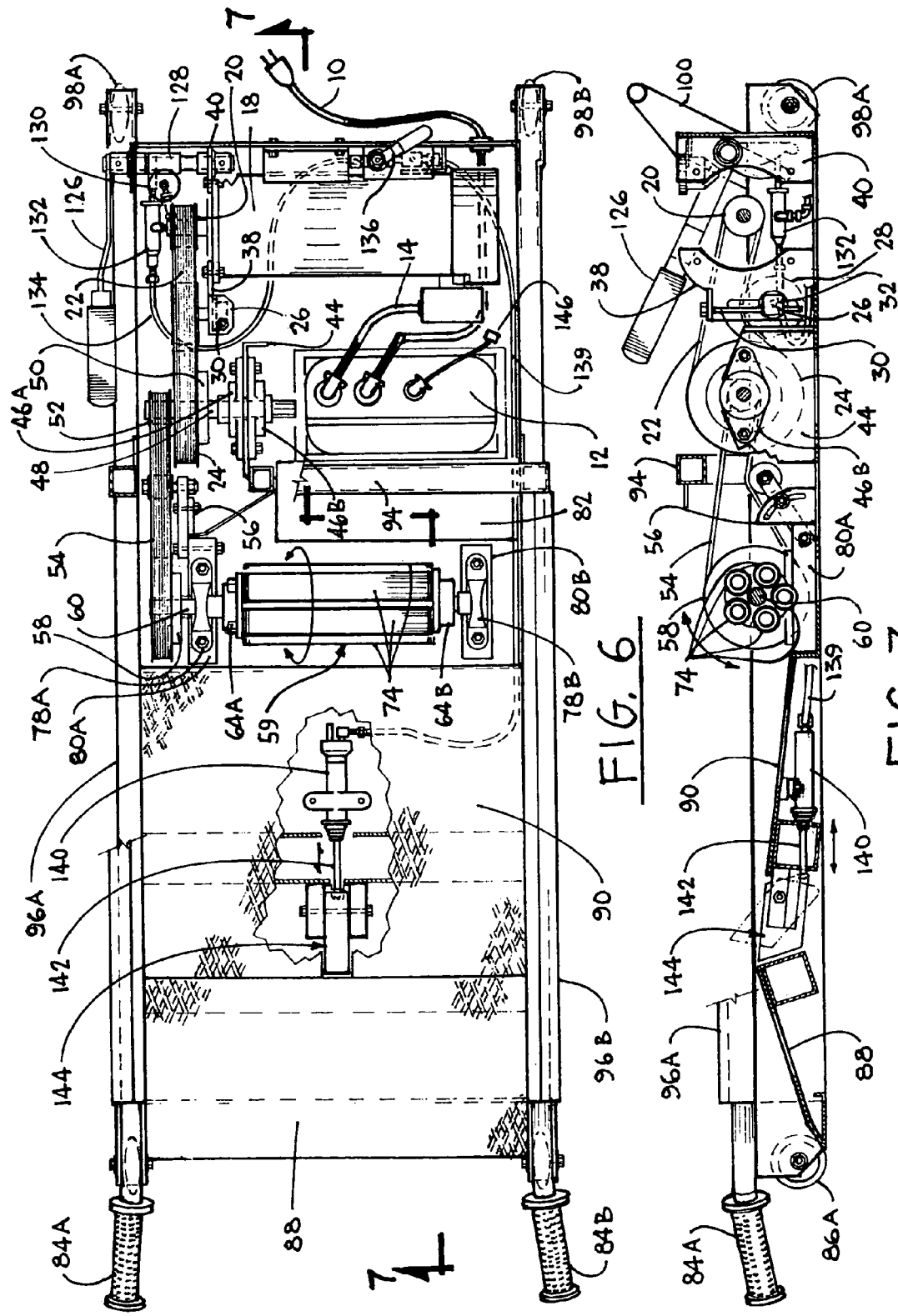

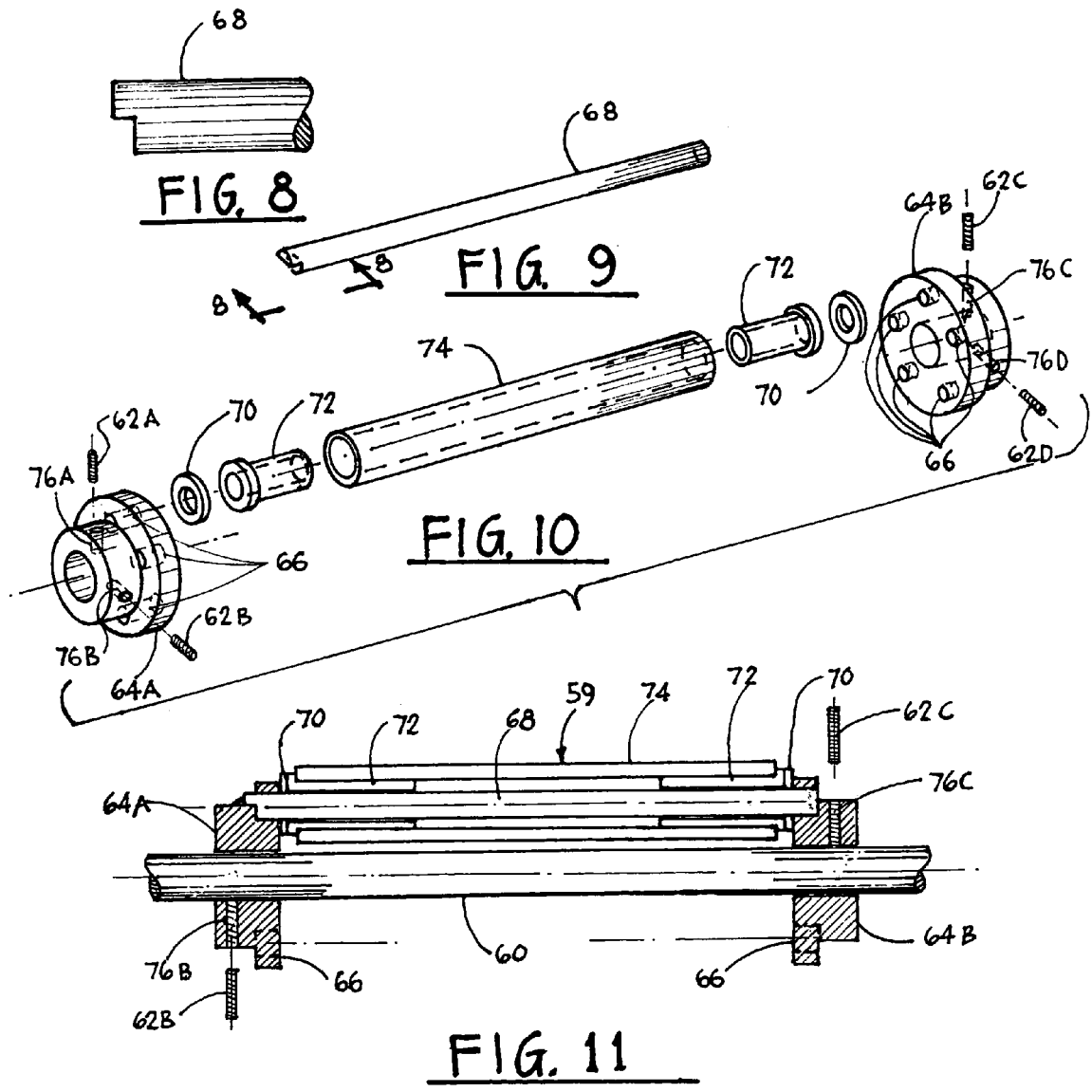

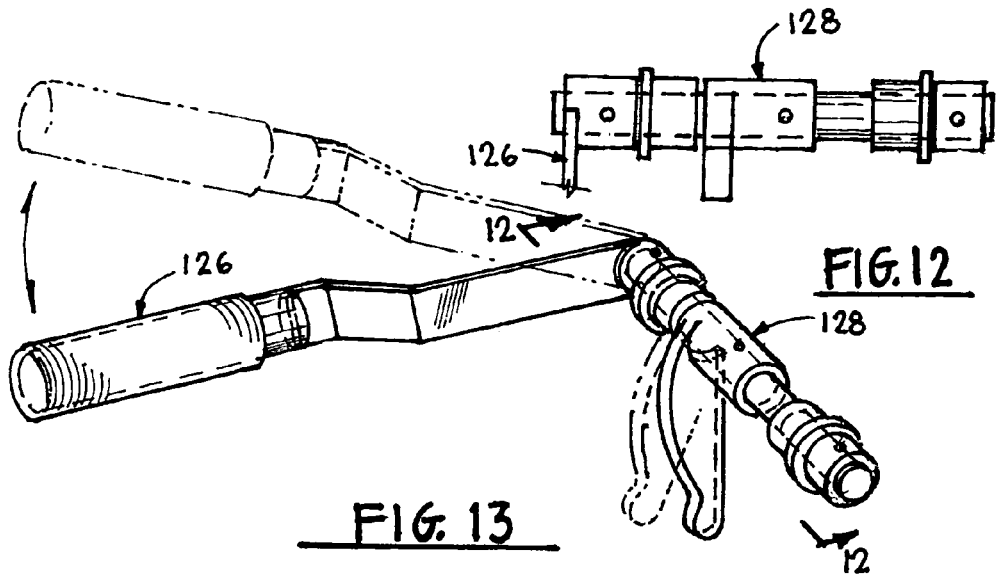
FIG. 12
FIG. 13
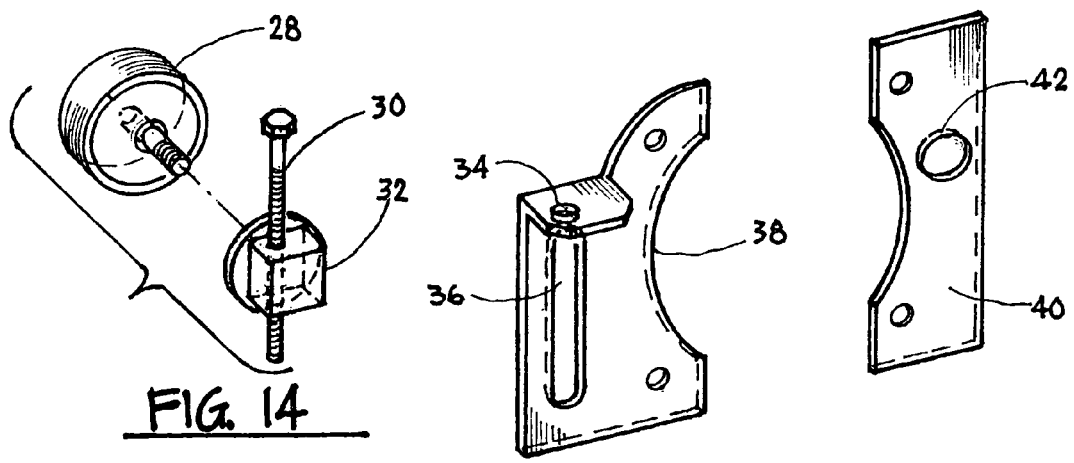
FIG. 14
FIG. 15
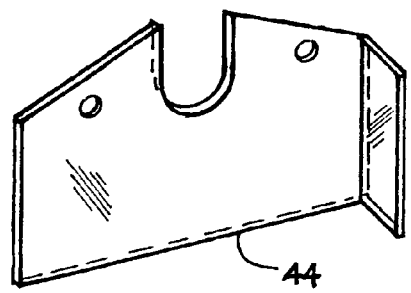
FIG. 16

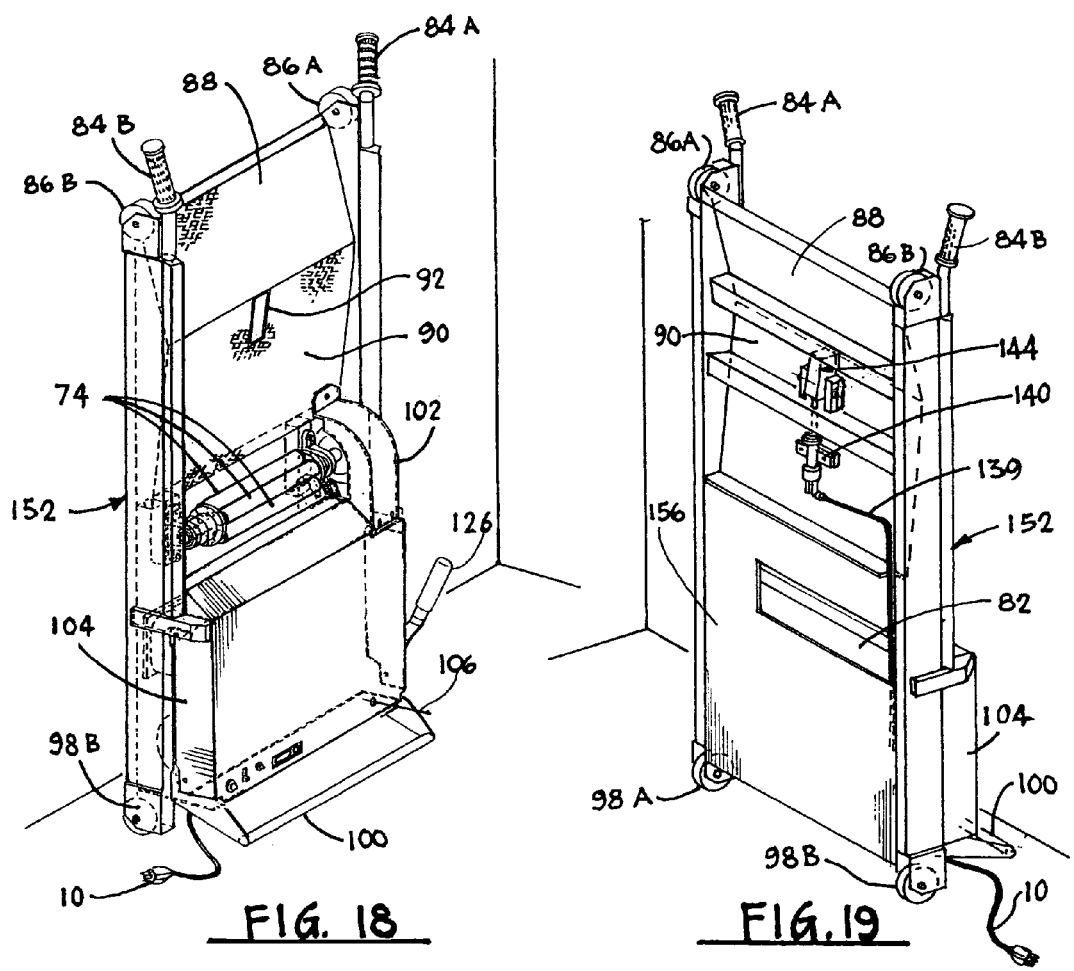

AUTOMOTIVE RATTLE DETECTION SYSTEM

BACKGROUND OF THE INVENTION

This invention relates to a method and apparatus for detecting and locating annoying rattles, squeaks and other noises in automotive vehicles, especially while they are in a stationary parked position. It is especially suitable for use by automotive repair and service personnel.

Modern automotive vehicles, whether automobiles, SUVs, trucks or minivans, are each configured by a complex structure of under the hood machinery, framing, doors, and related devices and compartments which have a potential for problematic vibrations, raffles and squeaks. Frequently, such unwanted noises are caused by glitches in the manufacturing process or even small items like nuts, washers or pieces of metal inadvertently left in framing structures or inside panels.

To help achieve high customer satisfaction, automotive vehicle manufacturers want to eliminate rattles, squeaks and other unnecessary and undesired noises from occurring. But because these objectionable noises only occur when the vehicle is in use, they are difficult and time consuming to track down and correct.

Vehicle rattle and noise related complaints are very common at dealer manufacturers' service centers. Addressing them usually involves a trained automotive mechanic or technician test driving the vehicle. Sometimes a second mechanic rides along either in the back or trunk of the vehicle. Heating and air conditioning systems in the vehicle are usually turned off to reduce internal vehicle noise and all windows are usually shut to reduce external noise from interfering with the detection and location of rattles. These situations cause extreme discomfort to the automotive mechanics while test driving in freezing winter weather or extremely hot summer weather.

An attempt by a motor vehicle manufacturer to provide an apparatus for the identification of vibration induced noises on vehicles in a stationary test facility is described in U.S. Pat. No. 5,551,298 to Rayment, Sep. 3, 1996. A large, space consuming and expensive apparatus is disclosed comprising a means for supporting the entire vehicle on its wheels, a vibration generator (preferably hydraulically driven) for vibrating the wheel supporting means, a control means for controlling the frequency of operation of the vibration generator, a data capture means for receiving inputs for vibration induced noises, and a means for comparing the frequency at which the induced noise occurs with a set of stored data to hopefully identify the source of the vibration induced noise.

The vehicle support means of Rayment has four separate wheel supporting columns, each of which can be oscillated separately to vibrate the supported vehicle. While such a large intricate system may be beneficial at a major automotive manufacturing facility, it is just too large, intricate and expensive for the thousands of auto dealership service centers or unaffiliated auto repair shops nationwide.

In U.S. Pat. No. 5,574,226 to Reuther et al, Nov. 12, 1996, a large environmental auto test facility for testing vehicle suspension and body components is disclosed. This facility is transportable in large trailers over conventional roads and is essentially self-contained for set-up at automotive manufacturing facilities. It provides a four-posture hydraulic suspension with each hydraulic actuator independently controllable and adapted to engage one of the tires of the vehicle to be tested. The plurality of hydraulic actuators are associated with the bed of the trailer and specific seismic mass.

One purpose of Reuther et al is to make an effort to ensure new vehicles are quiet and essentially free of squeaks and rattles. However, the trailer mounted road simulator environmental test facility disclosed, while designed for use at an automotive manufacturing facility is exorbitantly expensive, too space requiring, intricate, and costly to operate for even automotive dealer service centers or independent auto repair shops.

The vibration and acoustic sound diagnostic instrument disclosed in U.S. Pat. No. 5,435,185 to Eagen, Jul. 25, 1995, is usable by professional automotive mechanics for discriminating audible vibration sound and noise from under-chassis and under-hood parts and devices having mechanical faults. It includes one or more acoustic vibration pick-up devices adapted for mounting in contact with an automotive part for detecting and converting vibratory acoustic signals and sounds into electromagnetic signals and an electronics housing conforming to be hand held. A preamplifier circuit in the housing is coupled to the acoustic vibration pick-up device and to range selector circuitry for selecting sound level ranges. A decibel meter, mounted to the housing exterior, is interconnected to the pre-amplifier for visually indicating changes and peaks in sound levels detected by the transducer microphone. Audio amplifier circuitry within the housing is interconnected to pre-amplifier circuitry for converting the electromagnetic signals into secondary acoustic signals that may be listened to by an automotive mechanic through an earphone headset electrically interconnected to the audio amplifier. A battery power supply within the housing energizes the instrument.

A disadvantage of this sound diagnostic instrument is it was designed for use during normal driving movement of the vehicle. It may, however, if extreme sound sensitivity is desirable, be used in conjunction with applicant's invention while the vehicle to be tested is in a stationary position.

BRIEF SUMMARY OF THE INVENTION

In accordance with the present invention, a versatile method and apparatus are provided for detecting and locating unwanted rattles, squeaks and other noises in automotive vehicles while such vehicles are in a stationary position with their engines turned off. The apparatus is comprised of a frame mounted multi-roller assembly, mechanically rotated by an electro-mechanical drive train, electrically powered and remotely controlled, such that the longitudinal side of each roller in the assembly continuously strikes the treaded lower half of a particular tire of the vehicle at a predetermined angle and range of rotational speed and produces vibrations and shock waves in the vehicle which produce the same rattles and noises noticed during driving conditions. An automotive mechanic or technician can thereupon locate and repair the cause of these annoying noises. Normal hearing can be relied upon for detecting such noises or in much less frequent but difficult cases, additional acoustic sound diagnostic instruments such as are disclosed in the prior art of U.S. Pat. No. 5,435,185 can be used in conjunction with this invention.

Several objects and advantages of the present invention are:
   a) To provide a diagnostic apparatus for vehicle noise detection which can be used for automobiles, SUVs, jeeps, trucks, mini and regular vans, and even mechanized golf carts.

b) To provide a diagnostic apparatus for vehicle noise detection useable when the automotive vehicle is stationary with its engine not running.
c) To provide a diagnostic apparatus for vehicle noise detection for use indoors or outdoors.
d) To provide a diagnostic apparatus for vehicle noise detection which engages only one wheel of the automotive vehicle at a time.
e) To provide a diagnostic apparatus for vehicle noise detection which can easily be made to engage any other wheel of the automotive vehicle being tested.
f) To provide a diagnostic apparatus for vehicle noise detection operated by a single person.
g) To provide a diagnostic apparatus for vehicle noise detection operable by remote control.
h) To provide a diagnostic apparatus for vehicle noise detection of a small compact size and portable.
i) To provide a diagnostic apparatus for vehicle noise detection whose lightweight and integral wheels and handles allow for its easy mobility and manipulation.
j) To provide a diagnostic apparatus for vehicle noise detection which the overwhelming majority of its times in use provides easy location of rattles and squeaks; however, in extreme cases can also be used in conjunction with additional hearing magnified acoustic sound diagnostic instruments.
k) To provide a diagnostic apparatus for vehicle noise detection which is quite inexpensive and affordable compared to the multi-million dollar vibration induced noise apparatus built and presently used at automotive manufacturing facilities.
l) To provide a diagnostic apparatus for vehicle noise detection which takes up little space and can be easily stored standing on its end in an upright position.
m) To provide a diagnostic apparatus for vehicle noise detection which requires low maintenance.

BRIEF DESCRIPTION OF SEVERAL VIEWS OF THE DRAWINGS

FIG. 2 is a perspective view of a timing pulley cover.

FIG. 3 is a perspective view of the safety cover for the rattle detection device.

FIG. 4 is a condensed front sectional elevation view of the safety cover.

FIG. 5 is a perspective view of the hand held remote controller.

FIG. 6 is a plan view of the rattle detection device for automotive vehicles without its safety cover.

FIG. 7 is an elevation sectional view of the rattle detection device for automotive vehicles without its safety cover.

FIG. 8 is a partial view of an end portion of a roller assemble roller support shaft.

FIG. 9 is a perspective view of an entire roller assembly roller support shaft.

FIG. 10 is an exploded, perspective view of the roller assembly showing only one roller.

FIG. 11 is a frontal elevation view of the roller assembly showing only one roller.

FIG. 12 is an elevation view of the hydraulic system actuator shaft.

FIG. 13 is a perspective view of the complete hydraulic system actuator handle assembly.

FIG. 14 is an exploded view of a belt tensioner assembly.

FIG. 15 is a perspective view of the drive motor mounting bracket.

FIG. 16 is a perspective view of the idler mounting bracket.

FIG. 18 is a perspective view of the top side of the rattle detection device for automotive vehicles being stored in a space saving standing position on its back edge.

FIG. 19 is a perspective view of the bottom side of the rattle detection device for automotive vehicles being stored in a space saving standing position on its back edge.

REFERENCE NUMERALS IN DRAWINGS

Figure 1:
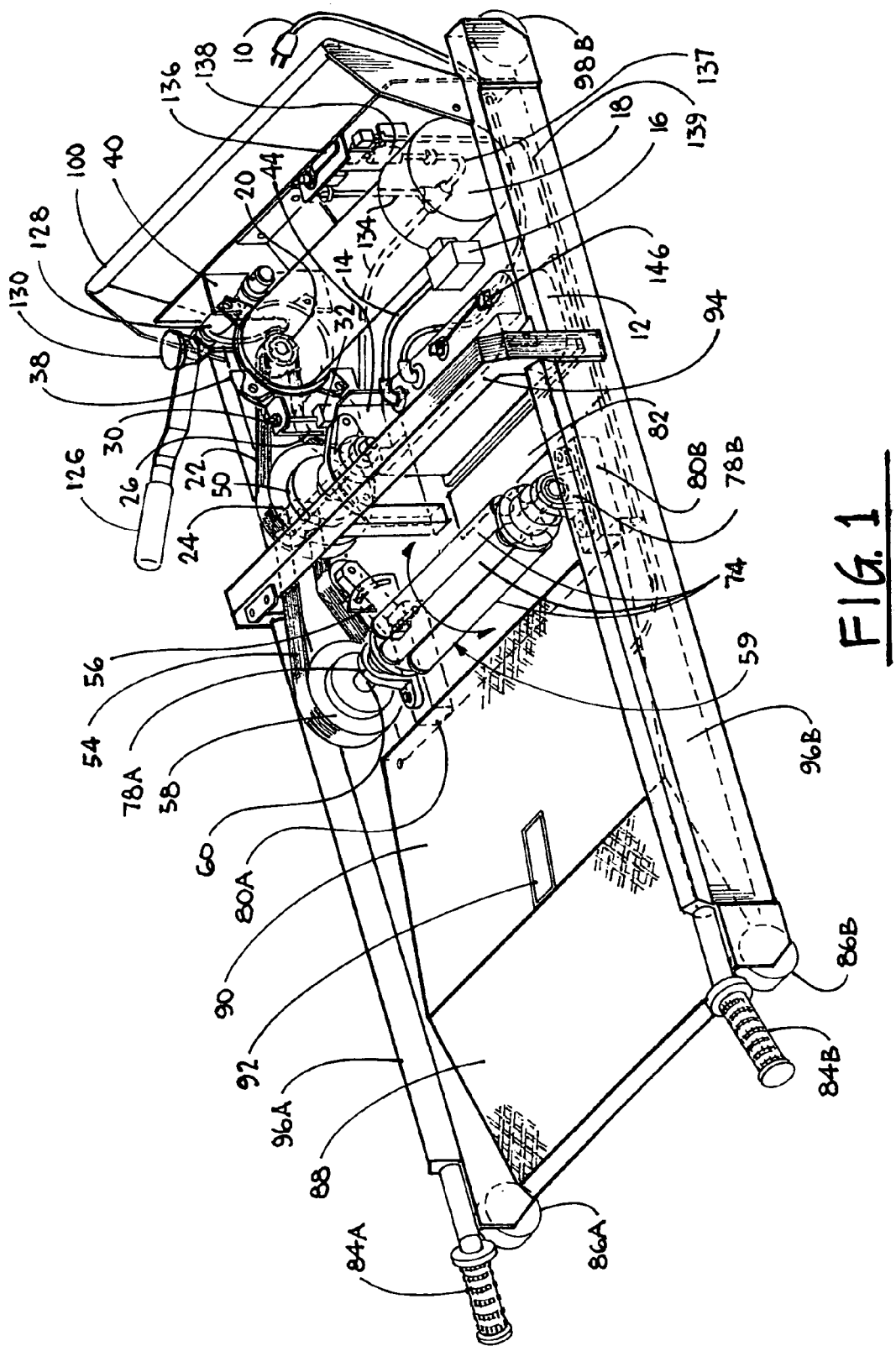
FIG. 1 is a perspective view of a rattle detection device for automotive vehicles with its safety cover removed.

| | |
|---|---|
| 10 | AC Power Cord |
| 12 | Electronic Speed Control |
| 14 | DC Power Cord |
| 16 | Motor Junction Box |
| 18 | DC Motor |
| 20 | Drive Pulley |
| 22 | First Drive Belt |
| 24 | Idler Pulley |
| 26 | Belt Tensioner |
| 28 | Tensioner Pulley |
| 30 | Tensioner Adjuster Bolt |
| 32 | Tensioner Adjuster Hub |
| 34 | Tensioner Adjuster Bolt Hole |
| 36 | Tensioner Adjustment Slot |
| 38 | Front Tensioner Motor Bracket |
| 40 | Rear Motor Bracket |
| 42 | Handler Lever Support Hole |
| 44 | Idler Mounting Bracket |
| 46A,B | Idler Flange Bearings |
| 48 | Idler Shaft |
| 50 | Large Idler Pulley Hub |
| 52 | Small Idler Pulley |
| 54 | Second Drive Belt |
| 56 | Belt Tensioner Assembly |
| 58 | Driven Pulley |
| 59 | Roller Assembly |
| 60 | Roller Drive Shaft |
| 62A,B,C,D | Roller Shaft Set Screws |
| 64A,B | Roller Shafts Support Hubs |
| 66 | Roller Shaft Receiver Holes |
| 68 | Roller Support Shafts |
| 70 | Thrust Washers |
| 72 | Roller Bushings |
| 74 | Rollers |
| 76A,B,C,D | Threaded Holes |
| 78A,B | Roller Assembly Support Bearings |
| 80A,B | Roller Assembly Spacer Block |
| 82 | Clean Out Slot |
| 84A,B | Front Handles |
| 86A,B | Front Wheels |
| 88 | Ascending Ramp |
| 90 | Descending Ramp |
| 92 | Tire Positioner |
| 94 | Frame Crossmember |
| 96A,B | Frame Side Rails |
| 98A,B | Rear Wheels |
| 100 | Rear Storage Support |
| 102 | Driven Pulley Cover |
| 104 | Safety Cover |
| 106 | Remote Control Antenna |
| 108 | Control Valve Slot |
| 110 | Receiver Power Activation Light |
| 112 | Remote Receiver On-Off Switch |
| 114 | Main Power Light |
| 116 | Remote Control Transmitter |
| 118 | Transmitter Antenna |
| 120 | Roller Assembly Speed Control |

-continued

| 122 | Transmitter On-Off Switch |
| 124 | Transmitter Roller Assembly Direction Switch |
| 126 | Tire Stop Adjusting Handle |
| 128 | Hydraulic Lever Actuator |
| 130 | Hydraulic Fluid Reservoir |
| 132 | Hydraulic Master Cylinder |
| 134 | Hydraulic Front Tubing |
| 136 | Hydraulic Control Valve |
| 137 | Hydraulic Bypass |
| 138 | Check Valve |
| 139 | Hydraulic Rear Tubing |
| 140 | Hydraulic Slave Cylinder |
| 142 | Push Rod |
| 144 | Tire Pressure Foot Assembly |
| 146 | Electrical Harness Connector |
| 148 | Cover Electrical Harness |
| 150 | Test Vehicle |
| 152 | Automotive Rattle Detector System |
| 154 | Automotive Technician |
| 156 | Bottom Frame Panel |

DETAILED DESCRIPTION OF THE INVENTION

As seen in the present invention, using a rotating roller assembly comprised of a plurality of rollers to continuously strike a particular tire of a stationary automotive vehicle at a predetermined angle and over a range of rotational speeds and directional changes, causes the automotive vehicle to exhibit the variety of unwanted rattles, squeaks and noises which are normally only made when driving on road surfaces. Thus continuously exhibited, the various annoying rattles and noises can be easily located as to their cause and then usually repaired while the roller assembly is operating or temporarily turned off, without the need of a test drive. The roller assembly is rotated by an electro-mechanical drive train mounted with it on a relatively small, lightweight and easily transportable and maneuverable frame.

The predetermined angle at which a tire is struck by the rollers of the rotating roller assembly is mainly a function of the outside diameter of the tire, the height and slope of the descending ramp where the tire comes to rest touching the roller assembly, the diameter of each individual roller, and the height and outside diameter of the mounted roller assembly. Actually it was determined beneficial rattle detection can be produced by striking a tire anywhere along its treaded bottom half while mounted on a stationary car; however, optimum results are achieved when the angle between the horizontal midsection of the tire and the point where the rollers strike the tire is 30° to 65°. This most beneficial narrow range of angles is what applicants have achieved in this invention.

Using this automotive rattle detection system on a relatively level floor is preferable. But, in instances where the floor isn't level, the detection system is provided with a tire positioner which is hydraulically activated by turning on a control valve and controlled by a tire stop adjusting handle which is pumped to move and hold the tire being tested against the roller assembly prior to and during the roller assembly's rotational activation. After testing for rattles and other noises the tire positioner is released and returned to its at rest position, flush with the top of the descending ramp, by simply turning a hydraulic control valve. Then the vehicle with the tested tire can be driven off the automotive rattle detection system.

A hand held remote controller provides ease of use for the rattle detection device. This controller can be operated either on the inside or outside of the stationary automotive vehicle and can start, stop, change rotational direction and vary the rotational speed of the rotating roller assembly. After use on one of the automotive vehicle's mounted tires, the rattle detection device can be moved to contact another of the vehicle's tires as a check to insure a detected noise has been repaired or to determine if any other rattles or noises are prevalent in closer proximity to the new tire being tested. In most cases only one tire will be tested for rattles and noises, while in other more rare cases, two or even all of the vehicle's tires will be tested.

DESCRIPTION—FIGS 1,2,3,4,5,6,7,8,9,10,11,12, 13,14,15,16,17,18 AND 19—

PREFERRED EMBODIMENTS

Like characters of reference designate like parts in those figures of the drawings in which they occur.

A preferred embodiment of the present invention is illustrated in FIGS. 1 to 19 inclusive. The interlocking, construction, and utility of the present invention will be made clear in these illustrations.

FIG. 1 is a perspective view of the invention with its safety cover 104 removed, while FIG. 6 is a plan view and FIG. 7 is an elevation section view of the invention, both also without the safety cover. On a preferably metal frame of welded aluminum approximate 18" wide by 4'-0 long are mounted critical elements of the rattle detection device. A 115 volt AC power cord 10 connects to an electronic speed control 12 for 115 volt AC conversion to 90 volt DC speed control with on-off, forward and reverse motor controls. A DC power cord 14 wires the speed control 12 to a motor junction box 16 which mounts to a ¾ HP 90 volt permanent magnet DC motor 18.

The motor's drive pulley 20 contacts a ¾" wide by 27" long first drive belt 22 made of nylon reinforced belted rubber which turns idler pulley 24 and then contacts belt tensioner 26 with its corresponding tensioner pulley 28, tensioner adjuster bolt 30 and tensioner adjuster hub 32.

FIGS. 14 and 15 detail the mounting of an idler pulley adjuster to a drive motor mounting bracket. The tensioner pulley 28 has an integral center bolt which passes through tensioner adjustment slot 36 in front tensioner motor bracket 38 and screws into tensioner adjuster hub 32, while tensioner adjuster bolt 30 fits through tensioner adjuster bolt hole 34. A ¼" thick aluminum rear motor bracket 40 has a ⅝" diameter handle lever support hole 42 in it for accepting the shaft of hydraulic lever actuator 128. FIG. 16 is a perspective view of the timing pulley support bracket showing a ¼" aluminum idler mounting bracket 44.

Two ¾" self aligning steel idler flange bearings 46A and 46B shown in FIGS. 6 and 7 support a ¾" O.D.×6" long steel idler shaft 48 which is mounted to a ¾" I. D. large idler pulley hub 50 and a ¾" wide small idler pulley 52 which moves a ¾" wide by 27" long nylon reinforced belted rubber second drive belt 54 having its tension controlled by belt tensioner assembly 56. Second drive belt 54 turns a ¾" I.D. driven pulley 58 mounted to a ¾" diameter×14" keyed steel roller drive shaft 60.

In FIG. 11 a roller assembly 58 is shown in an exploded, perspective view, but with only one of the five rollers specified in the preferred embodiment design. Four steel roller shaft set screws 62A,B,C, and D screw into respective threaded holes 76 A,B,C, and D to secure the roller drive shaft 60 to two roller shafts supports hubs 64A and 64B, with two screws per each hub. Five ½" O.D. by ⅜" long roller shaft receiver holes 66 per each of the two roller shafts support hubs 64A and 64B receive an end of a ½" O.D. by 9" hardened steel roller support shaft 68.

FIG. 8 shows an end portion of a roller support shaft 68 which has a protruding tooth of a semi-circular cross sectional design, which when inserted in the roller shaft receiver holes 66 of only the roller shafts support hub 64A have the end of said tooth exposed outside of but with its flat side against the hub which effectively prevents it from rotating on its own longitudinal center axis and thereby prevents steel against steel frictional wear. FIG. 9 shows a perspective view of an entire roller support shaft 68. The circular cross sectional ends of roller support shafts 68 are only inserted into the roller shaft receiver holes 66 of roller shaft support hub 64B.

FIG. 10 is an exploded, perspective view of the roller assembly showing only one roller and without the roller support shaft 68 which belongs inserted through the center of the ¾" I.D. by 1¼" O.D. by 7¾" long aluminum roller 74. A ½" I.D. by ¾" O.D. by ½" brass roller bushing 72 is inserted inside each end of the roller 74, with a ½" I.D. by 1" O.D. by ⅛" thick nylon thrust washer 70 adjacent its non-inserted end. Thus the roller 74 is able to rotate around its internal center axis after striking a tire being tested and thus minimize excess frictional wear on the tire and the roller assembly.

While five is the preferred number of rollers mounted on roller assembly 58, anywhere from just one to a plurality of rollers numbering up to about twelve could be used with appropriate roller sizing and mounting design. But a considerable design program coupled with trial and error testing resulted in the five roller configuration shown, whereby the roller assembly rotation of between 40 and 175 revolutions per minute (RPM) most duplicated vehicle road testing conditions for achieving vehicle rattle and noise detection.

Positioning of roller assembly 59 in relation to other elements of the automotive rattle detector system 152 is most clearly shown in FIGS. 1, 6 and 7. The roller drive shaft 60 is supported near both its ends by carbon steel based roller assembly support bearings 78A and 78B which are in turn mounted on 1" high by 1½" wide by 4" long aluminum roller assembly space blocks 80A and 80B, respectively, which are mounted by welding and bolting them to the ¼" aluminum bottom frame panel 156. Positioned below and slightly back of the roller assembly 59 is about a 3" wide by 10" long clean out slot 82 cut out of bottom frame panel 156. It allows for any debris that falls off a dirty tire being struck by rotating rollers to fall through it and be disposed of after the testing operation, when the automotive rattle detection system 152 is lifted and moved.

Rubber gripped front handles 84A and 84B facilitate handling in conjunction with ¾" wide by 2½" high rubber front wheels 86A and 86B and rear wheels 98A and 98B. Both of these wheel sets remain elevated slightly above ground level until the entire automotive rattle detection system 152 is tilted toward its front or back.

A 14½" wide by 8½" long ¼" thick aluminum plate ascending ramp 88 is inclined at 17° and welded to a 14½" wide by 13½" long ¼" thick aluminum plate descending ramp 90 set at a 6° decline. Tire positioner 92 when at rest is flush with the top surface of descending ramp 90 and when elevated will rotate up to 70° toward the back of the system. Frame crossmember 94 is aluminum and provides a cross brace and safety cover 104 support. Side support for the frame is provided by ⅛" thick walled aluminum 1" wide by 3" high by 48" long frame side rails 96A and 96B. A ¾" diameter by ⅛" walled aluminum tubing rear storage support 100 is provided at the back end of the unit's frame to facilitate handling and allow it to be stored in a standing on rear end position.

FIG. 2 is a perspective view of a timing pulley cover and shows an aluminum driven pulley cover 102. FIG. 3 is a perspective view of the aluminum safety cover 104 for the rattle detection device. Shown on it are a remote control antenna 106, control valve slot 108 allowing a tire positioner hydraulic control valve 136 to be positioned above the assembled cover, receiver power activation light 110, remote receiver on-off switch 112, main power light 114, and a cover electrical harness 148. FIG. 4 is a condensed front section elevation view of just the safety cover 104.

FIG. 5 is a perspective view of a hand held remote control transmitter 116 which contains a transmitter antenna 118, a roller assembly speed control 120, a transmitter on-off switch 122, and a transmitter roller assembly direction switch 124. The roller assembly speed control 120 has a knob ranging from fully counterclockwise to fully clockwise positions to produce roller assembly speed control from 40 RPM to 175 RPM.

FIG. 12 is an elevation view of the hydraulic system actuator shaft and FIG. 13 is a perspective view of the complete hydraulic system actuator handle assembly. Shown in them are a tire stop adjusting handle 126 and a hydraulic lever actuator 128. The hydraulic system is only activated if a vehicle's tire when driven onto the descending ramp 90 does not rest naturally against the roller assembly 59, usually due to a not level floor. For such situations, said hydraulic system, best shown in FIGS. 1, 6, and 7 is activated to move tire positioner 92 against the tire to be tested, keeping it from rolling away from the roller assembly 59. Activation begins by closing a hydraulic control valve 136 which allows brake fluid from hydraulic fluid reservoir 130 supplied to hydraulic master cylinder 132 flow through steel hydraulic front tubing 134, a hydraulic bypass 137, a check valve 138, and steel hydraulic rear tubing 139 to an aluminum hydraulic slave cylinder 140. Pressure is increased in hydraulic slave cylinder 140 by pumping tire stop adjusting handle 126 by pulling it upward about two or three times, whereby a 5/16" O.D. by 4" long steel push rod 142 rotates the tire positioner 92 portion of tire pressure foot assembly 144 to contact and contain said tire and force it against roller assembly 59. At the completion of strike testing a tire, tire positioner 92 is returned to its at rest position flush with descending ramp 90 by turning hydraulic control valve 136 on which allows the hydraulic fluid to flow back to the hydraulic fluid reservoir 130.

Other viable methods could be used to operate a tire positioner type device when encountering floors that are not level. Such methods for causing a tire to exert pressure on a roller assembly could be mechanical or electrically powered or a combination of both.

An electrical harness connector 146 contains wires from electronic speed control 12 for switches which can be manually operated and light indication on safety cover 104 and plugs into cover electrical harness 148.

Figure 17:
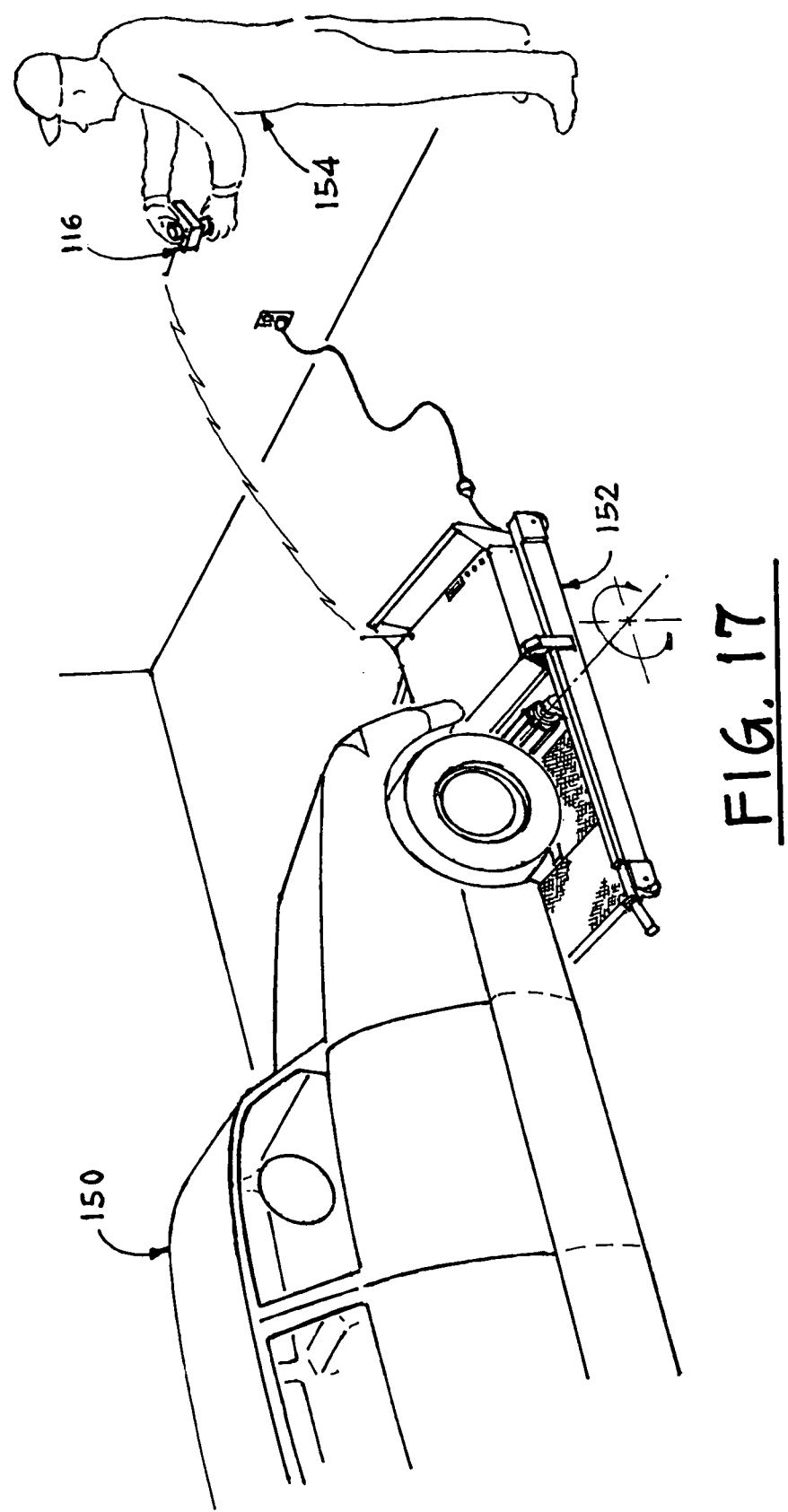
FIG. 17 is a perspective view of a rattle detection device for automotive vehicles with an automobile in position for testing and an automotive technician using a hand held remote controller.

FIG. 17 is a perspective view of an automotive rattle detection system 152 with its safety cover on operating with an automobile's tire in position on it. An automotive technician 154, in this case outside the automobile, is operating the rattle detection system with a hand held remote control transmitter 116. Since the floor is relatively level, which is usual, a tire pressure foot assembly has not been activated.

FIG. 18 is a perspective view of the top side of automobile rattle detection system 152 with its safety cover 104 on being stored when not in use. It is standing on its back edge near a wall in a space saving position balanced by rear storage support 100.

FIG. 19 is a perspective view of the bottom side of automotive rattle detection system 152 with its safety cover 104 on being stored in a space saving standing position on its back edge next to a wall. The rear storage support 100 provides balance.

OPERATION

An automotive technician 154, after being informed an automotive vehicle has an unwanted rattle or noise that requires locating and fixing, makes an educated guess as to which of the vehicle's tires is closest to the objectionable noise. This tire is the first and possibly only tire needed to be tested on the automotive rattle detector system 152. Next locate the detector system 152 and its remote control transmitter 116 which for convenience should be stored together in a low traffic area. Then position the front of the detector system 152 on the floor near the vehicle tire which is to be driven onto it. Plug the AC power cord 10 of the detector system 152 into an electrical 115 volt power supply.

Grasping the handle of the rear storage support 100, move the automotive rattle detector system 152 so that the leading edge of its ascending ramp 88 contacts the treads of the vehicle's tire. The automotive technician now enters the vehicle and using the remote control transmitter 116 turns the transmitter on-off switch 122 to on which causes roller assembly 59 to rotate at its lower level of about 40 RPM. Next the vehicle is very slowly driven into the proper position. Its tire rolls up the inclining portion of the ramp 88 and just begins to go down the descending ramp 90 when the vehicle is stopped, its transmission put in neutral and its engine turned off. Then the vehicle is allowed to roll down ramp 90 slowly until its tire makes contact with roller assembly 59. Thereupon the vehicle begins to shake mildly as rollers 74 strike the tire. Vehicles with automatic transmissions should be shifted to the park position, while those with manual transmissions should have their emergency brake set. The vehicle can now be exited if desired.

If the floor surface is significantly not level, use could be made of the tire positioner 92 to force and hold a tire against roller assembly 59. To accomplish this the tire should already be located between 59 and 92 when hydraulic control valve 136 is closed and tire stop adjusting handle 126 is pumped usually only two or three times by pulling it upward until tire positioner 92 raises to force the tire against roller assembly 59. This contact can be visually sighted or pressure buildup on the handle 126 felt. After testing and repairing operations are concluded, tire positioner 92 should be returned to its original at rest position by opening hydraulic control value 136 before driving the tire off the automotive rattle detection system 152. If this last action is not taken and the tire is backed off the unit, tire positioner 92 will be forcibly depressed and stay down without injuring the system, but it is best to follow this protocol and avoid unnecessary stresses.

To find bothersome rattles and noises first go to the general areas inside or outside the vehicle from which they are most likely to emanate. Using the remote control transmitter 116 increase and decrease the speed of the roller assembly 59 from about 40 RPM to as high as 175 RPM. This has the effect of a vehicle speeding up and slowing down on a rough highway and can help pinpoint the speed and conditions at which unwanted noises are generated and their locations. Changing the direction of rotation of 59 and then speeded up and slowed down as before using 116, in many cases proves helpful.

Controlling the change in rotational direction can be effected while the roller assembly 59 is rotating, since the rollers' 74 pressure on the tire will quickly stop it to facilitate the reversing action.

The automotive rattle detection system 152 can be wired so that its controls are mounted on it and thereby making it useable without a remote control transmitter 116. However, the ease of use and added mobility offered by 116 definitely make it the preferred control method to use.

Usually testing just one vehicle tire on the automotive rattle detection system 152 is sufficient; however, in especially difficult cases or to check remote areas of a vehicle or just to be extra sure all annoying noises were found, other tires of the vehicle can be tested in the same manner. When the source of a rattle or noise is thus located, it should be immediately fixed, if possible, while 152 is in operation or temporarily turned off. It can then be determined at once if the repair was successful.

The rattles, squeaks and noises made audible by operating the automotive rattle detection system 152 are usually able to be heard with the human ear. However, in extremely difficult cases an operator of the system may get additional help by using hearing magnified acoustic sound diagnostic instruments. Such cases are usually rare and not the norm.

After finishing using the automotive rattle detection system 152, make sure the tire positioner 92 is in its down and at rest position and turn off and unplug 152. The tested vehicle can then be started and slowly driven straight off 152. Since 152 weighs only about 100 pounds and is provided with both wheels and handles at both its front and rear ends, it is easily maneuvered. To move to a storage location simply grasp front handles 84A and 84B, lift to a comfortable level and push on rear wheels 98A and 98B to any safe place such as adjacent a wall or corner in a low traffic area where it can be stood up on its rear end and balanced by rear storage support 100. For convenience when needed, the remote control transmitter 116 should be stored with 152.

If cleaning of 152 is desirable, make sure the electrical power is disconnected and then wash other than the electronic components with a low abrasion cleaner such as dilute soapy water and a clean damp cloth.

Maintenance requirements of 152 are minimal. Once a year the idler shaft bearings 46A and 46B and the roller assembly support bearings 78A and 78B should be lubricated with an all purpose grease and the drive belts 22 and 54 checked for wear. Motors are self-sealed and lubricated.

ADVANTAGES

From the description above, a number of advantages of the invention become evident. A diagnostic apparatus for vehicle rattle and noise detection is provided which:
   a) Can be used on a variety of vehicles such as automobiles, SUVs, jeeps, trucks, mini and regular vans, and motorized golf carts.
   b) Can be used with a stationary vehicle with its engine off.
   c) Is useable either indoors or outdoors, considerably increasing the comfort of an operator.
   d) Only requires a single operator or automotive technician, greatly reducing cost to shop owners and customers.

e) Can be used by easily engaging only one of the vehicle's tires at a time.
f) Is operable by a remote control transmitter from either inside or outside the vehicle.
g) Is small, light weight, compact, portable and has several sets of integrally attached handles and wheels for ease of mobility and manipulation.
h) While usually just used in conjunction with the human ear, can in extremely difficult cases also be used with hearing magnified acoustic sound diagnostic instruments.
i) Is inexpensive and affordable compared to the huge multi-million dollar vibration induced noise apparatus built and used at automotive manufacturing facilities disclosed in the prior art.
j) Takes up little space and is easily stored standing upright on its rear end.
k) Is easy to clean and requires low maintenance.

CONCLUSION, RAMIFICATIONS AND SCOPE

Accordingly, the design elements and combinations of this invention provide for a portable automotive rattle and noise detection system that can be used on a wide variety of vehicles easily and economically. The economic benefits are inherent in the system's facilitating obtaining accurate results quickly, low manufacturing cost and hence purchase price, its low operating utility and maintenance costs, and the advantage of only requiring a single operator or automotive technician resulting in minimal labor costs. An added important advantage is the considerable time savings in performing an unwanted noise detection operation compared to the usual accepted practice of road testing a vehicle with a driver and an additional automotive technician passenger, who is sometimes even uncomfortably enclosed in a vehicle's trunk.

By producing a novel method of continuously striking a tire of a stationary vehicle at a predetermined optimal position and specified range of impact frequencies, the effects of various road conditions on a vehicle are emulated, allowing the vehicle to be tested and examined, either outdoors or preferably indoors where ambient conditions are both predictable and considerably more pleasant and reproducible. So what was once a disagreeable, uncomfortable, time consuming, and costly operation can now be performed quickly, easily, economically and in the comfort of indoor conditions. A relatively level floor which is preferred, but not essential to operation, is almost always available with indoor conditions, such as in an automotive dealer's service center or auto repair shop. There are many thousands of such locations in just the United States where this invention should not only be applicable, but welcomed.

While the above description contains many specificities, these should not be construed as limitations on the scope of the invention, but as merely providing illustrations of some of the presently preferred embodiments thereof. Many other variations are possible. For example, many of the automotive rattle detection system's framework and electromechanical components may be made longer, shorter, of a different diameter or size, of different capacities, of a lighter or stronger material, and of white, black or different colors. The system could also be made operational without a remote control transmitter or with other than a hydraulic fluid controlled tire pressure foot assembly.

Thus, the scope of the invention should be determined not by the embodiments presented, but by the appended claims and their legal equivalents.

Wherefore we claim:

1. An apparatus for producing and locating unwanted rattles, squeaks, and noises in an automotive vehicle by the sequential contacting of a surface of a tire on said automotive vehicle via at least one roller carried on a roller assembly comprising:
   (a) a frame comprised of a front end, a rear end, and legs in spaced apart relationship;
   (b) a roller assembly comprised of at least one roller rotatably supported outwardly from a center roller drive shaft in radial and spaced apart relationship, said rollers supported substantially parallel to said center roller drive shaft and substantially equidistant therefrom;
   (c) a bearing support system affixed for supporting the center roller drive shaft between the legs of said frame;
   (d) a powered drive train capable of rotating said center roller drive shaft and thereby said roller assembly; and
   (e) a control system for said powered drive train for starting, stopping, and rotating said center roller drive shaft in both clockwise and counterclockwise directions;
whereby when a tire of said automotive vehicle is placed in stationary relationship against said roller assembly and the roller assembly rotated causing a sequential and intermittent striking against said stationery tire, a vibration is created within said automotive vehicle allowing for a rattle, squeak, or noise to be generated.

2. The apparatus of claim 1 wherein said drive train is electrically powered and is capable of rotating said roller assembly between 0 and 300 RPM in both clockwise and counterclockwise directions whereby said striking occurs on the treaded surface of the lower half of said tire.

3. The apparatus of claim 2 wherein the front end of said frame comprises an ascending ramp affixed to a following descending ramp.

4. The apparatus of claim 3 wherein said ascending ramp is sloped at about 12° to 23° and said descending ramp is sloped at about 3° to 9°.

5. The apparatus of claim 4 wherein said drive train is electromechanical and affixed to said frame and comprises:
   (a) 115 volt AC power cord;
   (b) an AC/DC electronic speed controller;
   (c) a DC power cord;
   (d) a motor junction box;
   (e) a DC permanent magnet motor;
   (f) a drive pulley;
   (g) a timing drive belt;
   (h) an idler timing pulley;
   (i) a motor to idler belt tensioner;
   (j) a tensioner belt pulley;
   (k) a tensioner adjustment system;
   (l) a pair of motor brackets;
   (m) a pair of idler flange bearings;
   (n) an idler shaft;
   (o) an idler pulley hub;
   (p) a small idler pulley;
   (q) a second timing drive belt;
   (r) a belt tensioner assembly; and
   (s) a driven pulley.

6. The apparatus of claim 5 wherein said roller assembly comprises five rollers mounted such that when rotated they consistently strike the treaded side of any ordinary tire of 12" to 38" outside diameter at an angle approximately 30° to 65° below the horizontal midsection of said tire.

7. The apparatus of claim 6 wherein said control system comprises a hand held, portable, electronic, wireless, remote control transmitter, and a control receiver system.

8. The apparatus of claim 7 wherein a side rail is affixed to each side of said frame extending approximately the length of said frame.

9. The apparatus of claim 8 wherein a handle is affixed to the front end of each side rail.

10. The apparatus of claim 9 wherein a wheel is affixed to each side of the bottom front and rear ends of said frame.

11. The apparatus of claim 10 wherein a storage support bar is affixed to the rear end of said frame and extending perpendicularly upward from said frame.

12. The apparatus of claim 11 wherein a tire pressure foot assembly means is provided for forcing and holding said tire against said roller assembly.

13. The apparatus of claim 12 wherein said tire pressure foot assembly means is operated by a hydraulic fluid system comprising:
  (a) a tire stop adjusting handle;
  (b) a hydraulic lever actuator;
  (c) a hydraulic fluid reservoir;
  (d) a hydraulic fluid master cylinder;
  (e) hydraulic fluid tubing;
  (f) a hydraulic fluid control valve;
  (g) a check valve;
  (h) a hydraulic fluid slave cylinder; and
  (i) a tire pressure foot mounted flush with the top of said descending ramp and located within a front and center portion of said descending ramp;
wherein hydraulic fluid can be controlled to lift said tire pressure foot above said descending ramp to contact and move said tire.

14. The apparatus of claim 13 wherein said frame has an open clean out slot in it, underneath and slightly behind said roller assembly.

15. The apparatus of claim 14 wherein said frame is aluminum.

16. An apparatus for producing and locating unwanted rattles, squeaks, and noises in a stationary automotive vehicle comprising:

(a) an aluminum frame having a front end ascending ramp sloped at about 12° to 23° and immediately followed by and welded to a descending ramp sloped at about 3° to 9°;
  (b) a roller assembly consisting of five aluminum rollers mounted parallel to a center roller drive shaft which can be rotated;
  (c) a bearing support system affixed to said frame for supporting the roller assembly at each of its ends;
  (d) an electrically powered electromechanical drive train means affixed to said frame;
  (e) an electronic, portable, wireless, remote control transmitter and a control receiver system for starting, stopping, and rotating said roller assembly between 0 and 175 RPM in both clockwise and counterclockwise directions;
  (f) an aluminum side rail affixed to each side of said frame extending approximately the length of the frame;
  (g) a handle affixed to the front end of each side rail;
  (h) a wheel mounted to each side of the bottom front and rear ends of said frame;
  (i) an aluminum storage support bar affixed to the rear end of said frame and extending perpendicularly upward therefrom;
  (j) a means for contacting and releasing a tire standing on the descending ramp and forcing it to move against said roller assembly; and
  (k) a clean out slot cut out of said frame underneath and slightly behind said roller assembly;
wherein said roller assembly is mounted slightly past the descending ramp such that when rotated said rollers consistently strike the treaded side of any ordinary tire of 12" to 38" outside diameter standing stationary on said descending ramp at an angle approximately 30° to 65° below the horizontal midsection of said tire.

* * * * *